United States Patent
Reismann et al.

(10) Patent No.: US 11,661,942 B2
(45) Date of Patent: May 30, 2023

(54) ENERGY-SAVING OPTIMIZATION FOR A PUMPING PLANT

(71) Applicant: ABB Schweiz AG, Baden (CH)

(72) Inventors: Olaf Reismann, Mannheim (DE); Dominic Haas, Oberkirch (DE)

(73) Assignee: ABB Schweiz AG, Baden (CH)

( * ) Notice: Subject to any disclaimer, the term of this patent is extended or adjusted under 35 U.S.C. 154(b) by 89 days.

(21) Appl. No.: 17/238,252

(22) Filed: Apr. 23, 2021

(65) Prior Publication Data
US 2021/0239123 A1  Aug. 5, 2021

Related U.S. Application Data

(63) Continuation of application No. PCT/EP2019/078703, filed on Oct. 22, 2019.

(30) Foreign Application Priority Data

Oct. 25, 2018  (EP) .................................... 18202587

(51) Int. Cl.
  *F04D 15/02*  (2006.01)
  *F04D 13/14*  (2006.01)
  *F04D 15/00*  (2006.01)

(52) U.S. Cl.
  CPC ........... *F04D 15/029* (2013.01); *F04D 13/14* (2013.01); *F04D 15/0022* (2013.01)

(58) Field of Classification Search
  CPC ..... F04D 15/029; F04D 15/0072; F04D 13/14
  See application file for complete search history.

(56) References Cited

U.S. PATENT DOCUMENTS

| | | | | |
|---|---|---|---|---|
| 4,259,038 | A * | 3/1981 | Jorgensen | G05D 16/2073 417/5 |
| 5,742,500 | A | 4/1998 | Irvin | |
| 5,797,729 | A | 8/1998 | Rafuse, Jr. et al. | |
| 2015/0148972 | A1 * | 5/2015 | Blau | F04D 13/14 700/282 |
| 2017/0299123 | A1 * | 10/2017 | Fowler | F04D 15/00 |
| 2020/0379447 | A1 * | 12/2020 | Fread | G05B 19/4188 |

FOREIGN PATENT DOCUMENTS

DE  102014222962 A1  5/2016

* cited by examiner

*Primary Examiner* — Sabbir Hasan
*Assistant Examiner* — Jackson N Gillenwaters
(74) *Attorney, Agent, or Firm* — Leydig, Voit & Mayer, Ltd.

(57) ABSTRACT

A method for determining a set of optimal operating parameters for a pumping plant that pumps a fluid medium by a set of multiple pumps connected in parallel includes: determining, from the set of pumps, a set of possible scenarios, each scenario indicating, for each pump in the set, whether the pump is running or not running; optimizing, for each scenario, a set of operating parameters including operating parameters of the pumps that are running according to the respective scenario so that all running pumps together bring a given input mass flow of the medium from a given input pressure to a given output pressure while minimizing a total power consumption of all running pumps, and assigning the found minimum power consumption and the corresponding optimal operating parameters to the respective scenario; and determining, from the set of scenarios, the scenario with a lowest power consumption.

14 Claims, 6 Drawing Sheets

ENERGY-SAVING OPTIMIZATION FOR A PUMPING PLANT

CROSS-REFERENCE TO PRIOR APPLICATION

This application is a continuation of International Patent Application No. PCT/EP2019/078703, filed on Oct. 22, 2019, which claims priority to European Patent Application No. EP 18202587.4, filed on Oct. 25, 2018. The entire disclosure of both applications is hereby incorporated by reference herein.

FIELD

The invention relates to the optimization of operating parameters for a pumping plant that is configured to pump a fluid medium by a set of multiple pumps connected in parallel.

BACKGROUND

In many industrial and utility applications, a fluid medium has to be brought from a given input pressure $p_{in}$ to a given output pressure $p_{out}$ by means of pumping. If the demand for the mass flow $M_{in}$ varies over a wide range, it may not be practical and/or economical to meet this demand by means of one single pump. Rather, a pumping plant with a set of multiple pumps connected in parallel is used, which also adds redundancy in case one of the pumps fails.

For a set of identical centrifugal pumps running at the same rotation speed, it has been shown in WO 2014/040 627 A1 that there is frequently a choice how many of the available pumps may be used to process one and the same combined mass flow $M_{in}$. Choosing wisely is a crucial factor in the energy efficiency of the pumping plant.

SUMMARY

In an embodiment, the present invention provides a method for determining a set of optimal operating parameters for a pumping plant that is configured to pump a fluid medium by a set of multiple pumps connected in parallel, the method comprising: determining, from the set of pumps, a set of possible scenarios, each scenario indicating, for each pump in the set, whether the pump is running or not running; optimizing, for each scenario, a set of operating parameters comprising operating parameters of the pumps that are running according to the respective scenario so that all running pumps together bring a given input mass flow of the medium from a given input pressure to a given output pressure while minimizing a total power consumption of all running pumps, and assigning the found minimum power consumption and the corresponding optimal operating parameters to the respective scenario; determining, from the set of scenarios, the scenario with a lowest power consumption; and determining sought optimal operating parameter to be: running the pumps that are to be run according to the scenario at the operating parameters found for the scenario, and not running the pumps that are not to be run according to the scenario.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
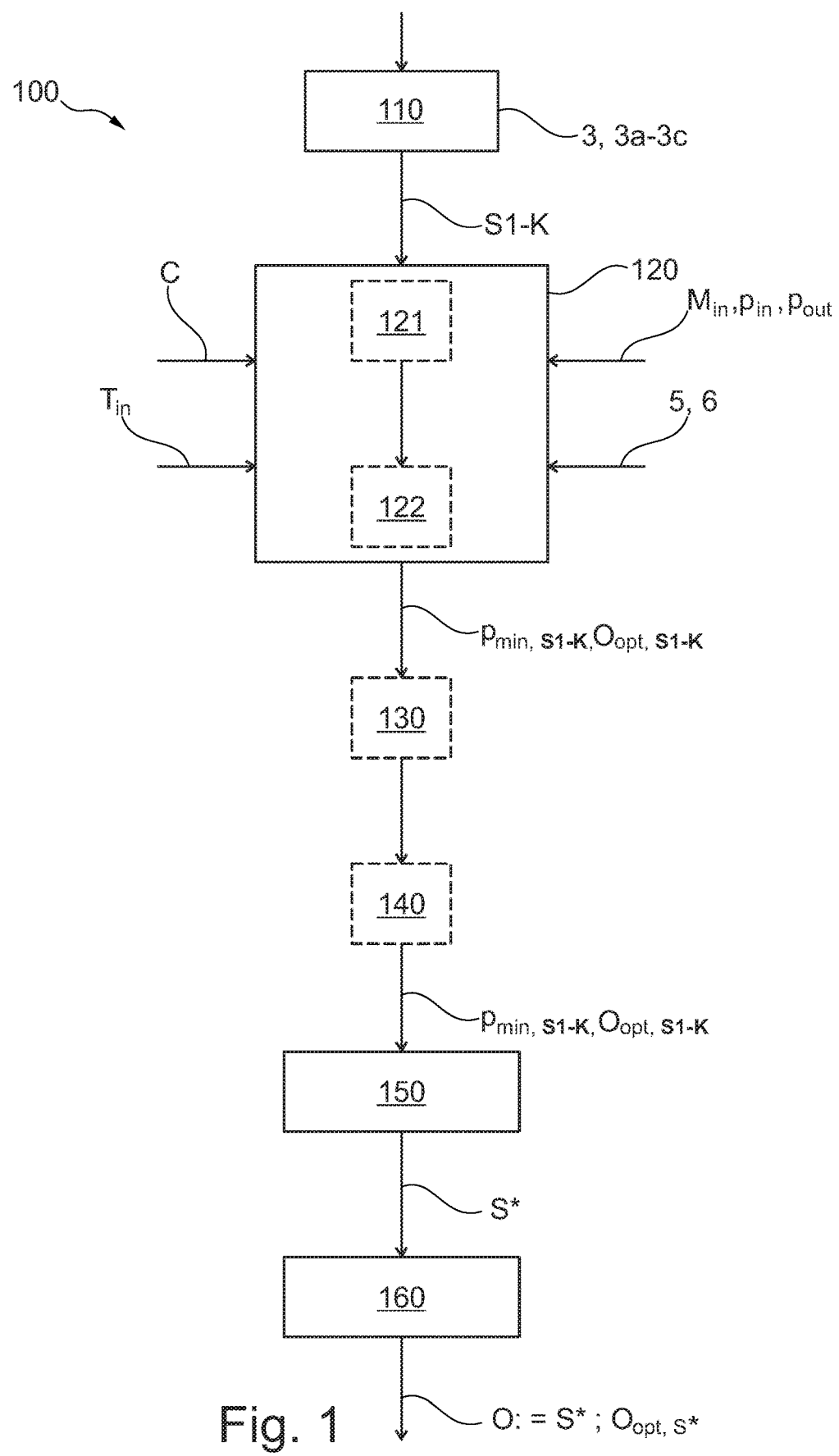
FIG. 1: Exemplary embodiment of the method 100 for determining optimal operating parameters for a pumping plant 1.

In an embodiment, the present invention increases the energy efficiency of a pumping plant, and does so for a broader class of pumping plants. The optimization target is to pump a given flow $M_{in}$ from inlet pressure $p_{in}$ to outlet pressure $p_{out}$ at minimum electrical power consumption.

In an embodiment, the present invention provides a method for determining a set of optimal parameters, the method for operating a pumping plant, and the computer program as described herein. Further advantageous embodiments are described herein.

The invention provides a method for determining a set of optimal operating parameters O for a pumping plant that is configured to pump a fluid medium by a set of multiple pumps connected in parallel. The fluid medium may especially be in a liquid state, in a gaseous state, in a state in between the two, an emulsion or a suspension.

The method is not limited to being performed on the site of the pumping plant, or in any other particular location. For example, the method may be run in a data centre to determine optimal operating parameters, given inputs such as the required input mass flow $M_{in}$, the input pressure $p_{in}$, and the output pressure $p_{out}$ that are delivered from a remote control centre. The resulting optimal operating parameters may then be delivered to the remote pumping plant where they are physically put into practice. One remote control centre may serve several data centres, and one data centre may serve many pumping plants. Also, several remote control centres and several data centres may serve any one pumping plant e.g. for redundancy.

From a mathematical point of view this is a mixed integer problem. The pumps may be off or running. If a pump is running, then the rotational speed shall be optimized. At time there are no numerical solvers available to solve this problem in one step. So ABB separated the problem in several steps:

1 Find all possible combinations of pumps being off or running;

2 for each combination find the rotational speed (or other operating parameter) of each pump for minimum electrical power consumption;

3 select the combination of pumps that fulfil all technical restrictions (e.g. min/max flow, min/max rotational speed) and that run with least electrical power consumption.

It is included in this invention that in case in future there are available solvers that solve the mixed integer problem well in one step, then the invention will use such future solver.

The method comprises determining, from the set of pumps, a set of K possible scenarios S1-K, wherein each scenario indicates, for each pump in the set, whether the pump is running or not running.

For example, in a pumping plant where three pumps are connected in parallel, each pump may be running or not running, so there is a total of $2^3=8$ possible scenarios. If the three pumps are identical and it is not important to evenly distribute the total amount of operating hours across all pumps, then the 8 possible scenarios may be reduced to three, namely running one, two or all three pumps. If the first and second pumps are of a first type and the third pump is of a different type, and if it is not important to evenly divide operating hours between the two pumps of the first type, then there are five different scenarios, namely:

only the third pump is running;

one of the first and the second pumps is running, the third pump is not running;

one of the first and the second pumps is running, the third pump is running;

both the first and the second pumps are running, the third pump is not running; and all three pumps are running.

For each scenario S1-K, a set of operating parameters O comprising operating parameters of the pumps that are running according to this scenario is optimized. That is, the problem solved during the optimization does not comprise the selection which pumps to run. Rather, the optimization starts from an already finished selection. As it will be discussed below, this difference is important.

The goal of the optimization is two-fold. It comprises that a) all running pumps together bring a given input mass flow $M_{in}$ of the medium from a given input pressure $p_{in}$ to a given output pressure $p_{out}$, while b) minimizing the total power consumption P of all running pumps.

The optimization may be performed in any suitable manner, especially using any suitable numerical method or solver as known in the art. Also, the two goals may be amalgamated in the optimization in any suitable manner. For example, the minimizing may be performed under the constraint that the actually processed flow matches the input flow $M_{in}$ and this is brought to the correct pressure $p_{out}$. But just as well, the matching of the mass flow $M_{in}$ and the output pressure $p_{out}$ may give rise to a term in a merit function of the optimization that also contains a term relating to the total power consumption P. The choice depends on the needs of the particular application, e.g., on how important an exact match of the mass flow $M_{in}$ and of the output pressure $p_{out}$ are compared with a minimum total power consumption P. In commercial applications, a cost savings of only a few percent may already make the difference between a profit and a loss.

The found minimum power consumption $P_{min,S1-K}$ and the corresponding optimal operating parameters $O_{opt,S1-K}$ are assigned to the scenario S1-K. That is, after all scenarios have been processed, the result is a list of at most K scenarios S1-K giving, for each scenario S1-K, a power consumption $P_{min,S1-K}$ together with a set of operating parameters $O_{opt,S1-K}$ that, when applied to the pumps running according to the scenario S1-K, result in the power consumption $P_{min,S1-K}$ being obtained.

From the set of scenarios S1-K, i.e., from said list, the scenario S* with the lowest power consumption $P_{min,S*}$ is determined. The sought operating parameters O, i.e., the sought instruction how to save power in the pumping plant, is then determined to be as follows:

Run the pumps that are to be run according to the scenario S*, run them at the operating parameters $O_{opt,S*}$ found for the scenario S*, and do not run the pumps that are not to be run according to the scenario S*.

The method entails computing a separate set of optimal operating parameters for each scenario, so the total workload for this computation is multiplied by the number of scenarios that are to be distinguished. However, the inventors have found that this is well over-compensated by a much better numeric stability of the optimization: If only one optimization were to be performed and the selection which pumps to run were to be a part of this optimization, then the selection which pumps to run would be a variable that is constrained to integer values, as any pump can only be either run or not. Since the other sought operating parameters are typically real-valued (i.e., not constrained to being integer), the optimization problem would become a "mixed-integer problem" that is considerably harder and less stable to solve than a purely real-valued problem. Thus, performing the selection of the running pumps before the actual optimization avoids "tainting" the problem with integer constraints, and finally opens the door to introduce a new flexibility regarding the operating parameters of the individual pumps.

Also, there is no more limitation that all pumps in the pumping plant be identical. Because industrial pumps are used for a long time, it is a frequent occurrence that if pumps in the plant are initially identical and one pump is replaced later, the new one is somewhat different from the other ones. It may even be advantageous to deliberately design the pumping plant with different types of pumps in the first place to meet varying demands for input mass flow $M_{in}$.

In a particularly advantageous embodiment, the optimizing is performed under a set of constraints C for one or more operating conditions of each individual pump, and/or of the plant as a whole. These constraints may apply to all scenarios, or they may apply only to particular scenarios. One example of a scenario-specific constraint is a limit to the total amount of power consumed by pumps sharing a same electrical supply.

Preferably, the constraints C comprise a minimum flow, a maximum flow, a minimum operating speed, and/or a maximum operating speed, for at least one pump. These are the most important constraints that are specific to a pump as such.

In a further particularly advantageous embodiment, the optimizing is performed given additionally the input temperature $T_{in}$ of the medium, and the constraints C comprise a net positive suction head requirement for at least one pump. In this manner, cavitation, which may damage the pump in short order, may be avoided.

Preferably, during or after the optimizing, a scenario S1-K is eliminated from further consideration in response to determining that no minimum power consumption $P_{min,S1-K}$ and corresponding optimal operating parameters $O_{opt,S1-K}$ meeting all constraints C exist. For example, the optimization may be performed by considering the constraints C as "soft constraints". E.g., non-observance of the constraints C is penalized in the merit function of the optimization, but iterations through parts of the parameter space not meeting the constraints C are admitted nonetheless in the hope that the final result will meet the constraints C. If this does not happen, then the respective scenario S1-K may be culled. If there is no solution that can deliver the requested flow within the constraints C such as NPSH value, then the optimization will deliver the next possible flow that can full fill the constraints C. There will always be at least one flow that meets the constraints C because the pumping plant has been operated previously while meeting the constraints C.

The invented method is applicable for any kind of pump, e.g. for displacement pumps and for velocity pumps.

In a particularly advantageous embodiment, the at least one pump is chosen to be a centrifugal pump. Such pumps are preferable when a high continuous flow of medium, rather than an intermittent flow according to the strokes of a piston pump, is desired.

Preferably, the to-be-optimized operating parameters O of the centrifugal pump comprise a rotating speed N of each running pump. With the ready availability of high-powered inverters that can transform an AC voltage to a wide range of frequencies, the rotating speed N may easily be varied in response to a changing desired input mass flow min.

Preferably, the optimizing is performed under the further constraint that for each running pump, the head H achieved by this pump depends on the flow rate Q of this pump according to a given pump curve, wherein the pump curve depends on the rotating speed N of the pump. This means that whenever either the flow rate Q or the head H changes, then the respective other parameter must change too, and this change depends on the rotating speed N. When such a constraint is in place, the optimization algorithm may, for example, restrict steps from one tested point of operation to a next candidate point of operation to combinations of motion along a current pump curve and motion from a current pump curve to a new pump curve for a different rotating speed N.

Preferably, the optimizing is performed under the further constraint that for each running pump, a variation of the head H of this pump depends on the variation of the flow rate Q of this pump according to a given affinity law that is dependent on the flow rate Q of the pump. Such an affinity law may embody the geometry of the pump, especially of the impeller. In a plot of head against flow rate Q, the affinity law usually takes the form of a parabola. The affinity law typically intersects each pump curve once, i.e., it couples points of operation on different pump curves together. I.e., when the rotating speed N of the pump is to be changed from a current speed to a new speed, the affinity law dictates between which points of operation the transition will have to take place.

In a further advantageous embodiment, the operating parameters O further comprise a set point for a throttling valve that is connected in the plant downstream of the set of pumps. This is a further degree of freedom that allows to lower the final output pressure $p_{out}$ of the plant below the pressure initially generated by the pumps.

The invention also provides a method for operating a pumping plant that is configured to pump a fluid medium by a set of multiple pumps connected in parallel. The method comprises obtaining a set of optimal operating parameters O that has been determined, according to the method described above, from the combination of a given input mass flow $M_{in}$ of the medium, a given input pressure $p_{in}$, and a given output pressure $p_{out}$. The method then also comprises setting and/or modifying operating parameters according to the obtained optimal operating parameters O.

As already noted above, the determining a set of optimal operating parameters O and the setting and/or modifying of the set points in the actual pumping plant need not happen in one and the same place. For example, the optimal operating parameters O may be provided "as a service" from a cloud server in response to receiving input data, e.g., the current mass flow $M_{in}$, from the pumping plant.

Preferably, the modifying set points of operating parameters comprises superimposing the optimal operating parameters O onto operating parameters delivered from a controller. In this manner, in the event that the obtaining new optimal operating parameters O should be interrupted, the pumping plant will continue to run. Only the power savings may cease to be present until the obtaining of optimal operating parameters O is restored.

In one embodiment, a controller is chosen that is configured to equally divide the input mass flow $M_{in}$ among all pumps in the set of pumps. This is the configuration that is least likely to violate any constraints of individual pumps, or of the pumping plant as a whole. There are also advantageous embodiments where the controller divides the input mass flow $M_{in}$ differently among the pumps.

In a further particularly advantageous embodiment, it is further monitored whether the means employed for determining the set of optimal operating parameters O are functional. If these means are no longer functional, the superimposing is disabled. For example, a watchdog circuit may determine that a computer used to calculate the optimal operating parameters O is no longer working, or that the connection to a remote service that provides optimal operating parameters O has gone down. Optionally, the disabling may be accompanied by introducing, into the path from the controller to the pumps, a hard limiter with constant limits for the minimum and maximum rotation speed of the respective pump, so as to avoid entering the forbidden area under all circumstances.

Preferably, the disabling is performed by superimposing, onto the operating parameters delivered from the controller, neutral parameter values instead of the optimal operating parameters O. For example, if the superimposing is performed in an additive manner, zeroes may be used as neutral parameter values. If the superimposing is performed in a multiplicative manner, ones may be used as neutral parameter values.

In a further advantageous embodiment, the switching between superimposing optimal operating parameters O and neutral parameter values is ramp rate limited. In this manner, there is no abrupt transition when the superimposing is enabled or disabled; rather, the superimposing is slowly "phased in and out" from/towards the neutral values.

As discussed above, the invention may be implemented in a software, or even in different interacting software components running in different places. The invention therefore also provides a comprising machine readable instructions that, when executed by a computer, a controller, and/or an embedded device, cause the computer, the controller, and/or the embedded device, to perform one or both of the methods described above. Likewise, the invention also provides a non-transitory storage medium with the computer program.

FIG. 1 is a flow chart of an exemplary embodiment of the method 100 for determining a set of optimal operating parameters O. The method starts in step 110 given a set 3 of pumps 3a-3c. From this set 3 of pumps 3a-3c, a set of K possible scenarios S1-K is generated. As described above, each scenario indicates which of the pumps 3a-3c are running and which of the pumps 3a-3c are not running.

Figure 2:
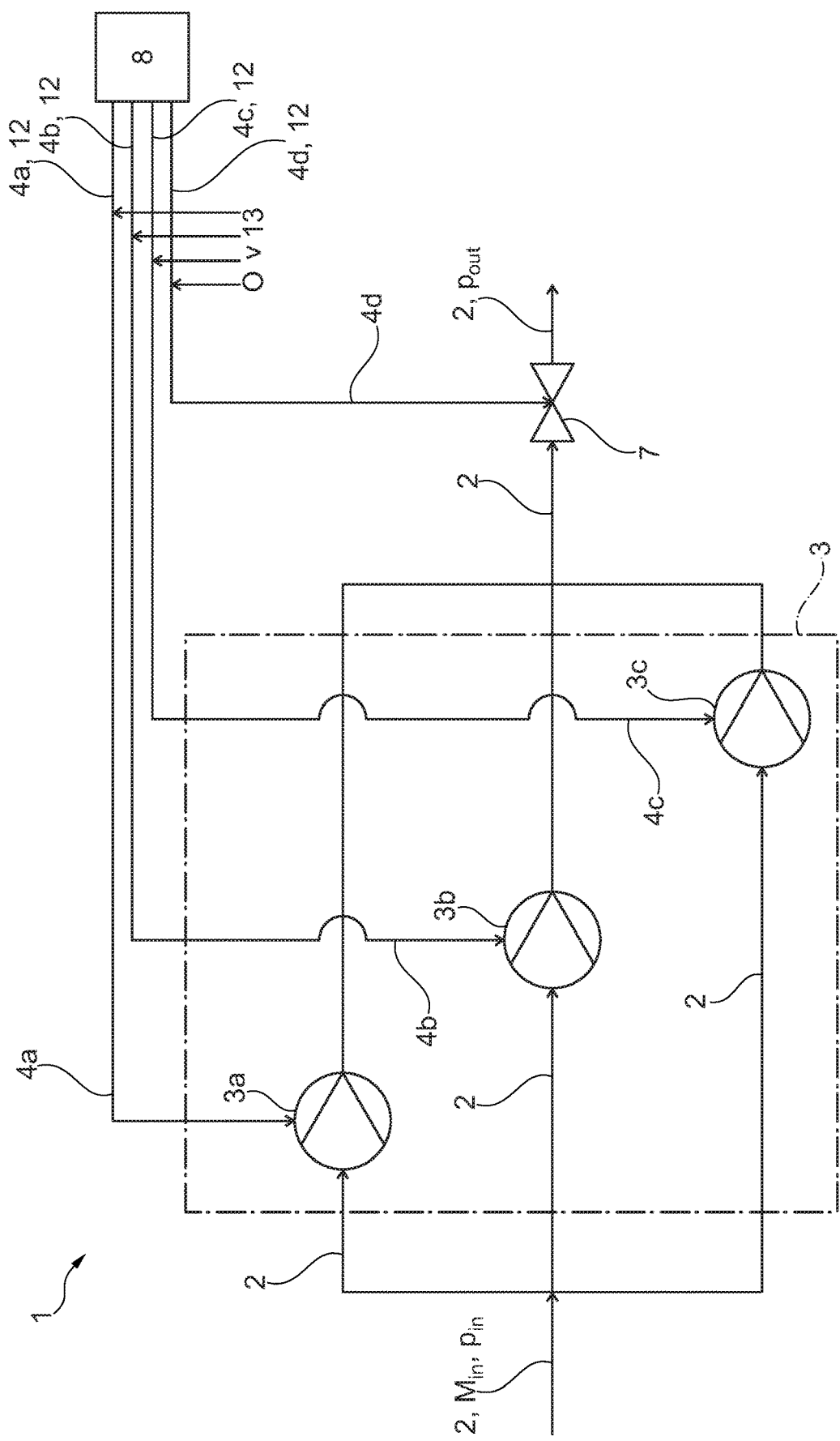
FIG. 2: Exemplary pumping plant 1 with optimization in place.

The ensuing optimization in step 120 is performed for each scenario S1-K. I.e., it is taken as a given which pumps 3a-3c shall run and which pumps 3a-3c shall not run according to the respective scenario. The available degrees of freedom, i.e., the to-be-optimized parameters O, comprise operating parameters of the pumps that shall run, and may also comprise operating parameters for other components of the plant, such as a throttling valve 7 as shown in FIG. 2.

The job that the pumping plant 1 shall accomplish in each scenario is to bring a given mass flow $M_{in}$ from an input pressure $p_{in}$ to an output pressure $p_{out}$. The goal of the optimization is to find operating parameters for accomplishing the job with a minimum total power consumption P. The operating parameters may be under a number of boundary conditions C relating to the pumps $3a$-$3c$, and/or to the pumping plant as a whole. One such important boundary condition may be that no cavitation occurs inside any of the pumps $3a$-$3c$. In this case, the input temperature $T_{in}$ of the medium 2 is needed in the optimization as well, because the steam properties of the medium 2 are dependent on this temperature $T_{in}$.

Furthermore, the physical properties of each pump $3a$-$3c$ may couple the head H achieved by this pump $3a$-$3c$ to the current flow rate Q of this pump $3a$-$3c$ by means of a pump curve 5. Also, said physical properties may dictate that an affinity law 6 links any variations of the head H of the pump $3a$-$3c$ to a corresponding variation of the mass flow Q.

For each scenario S1-K, the result of the optimization 120 is an optimal set $O_{opt,S1-K}$ of operating parameters O that achieves the minimum power consumption $P_{min,S1-K}$. Optionally, it may be detected in step 121 within the optimization 120 that no optimal set $O_{opt,S1-K}$ of operating parameters meeting all constraints C exists for a given scenario S1-K. The scenario S1-K may then be culled from further consideration in step 122. But said detection may also be performed after the optimization in step 130, so that said culling may be performed in subsequent step 140.

Either way, from all scenarios S1-K left to consider, a scenario S* with the lowest power consumption $P_{min,S*}$ is selected in step 150. In step 160, the final set of operating parameters O for the pumping plant 1, i.e., the sought instruction for running the power plant, is determined as follows: Run only those pumps $3a$-$3c$ that shall be running according to the optimal scenario S* determined in step 150, and use the plant operating parameters $O_{opt,S*}$ when doing so. Do not run those pumps $3a$-$3c$ that shall not be running according to the optimal scenario S*.

As discussed above in more detail, the main advantage of the method 100 is that the numerical optimization performed in step 120 for each scenario is a purely real-valued one without integer boundary conditions because the integer conditions have already been dealt with in step 110 when setting up the scenarios S1-K. This makes the optimization 120 more accurate and more stable, at the small price that this optimization 120 needs to be performed for multiple scenarios S1-K, of which only one will be used in the end.

FIG. 2 shows an exemplary embodiment of a pumping plant 1 with the optimization in place. Three pumps $3a$-$3c$ are connected in parallel in a set 3. Each pump $3a$-$3c$ may be operated according to individual operating parameters $4a$-$4c$. Furthermore, a throttling valve 7 is operated according to a set point $4d$. Behind the throttling valve 7, the mass flow $M_{in}$ of medium 2 has been brought from the original input pressure $p_{in}$ to the desired final pressure $p_{out}$.

The operating parameters $4a$-$4c$ of the pumps $3a$-$3c$, as well as the set point $4d$ of the throttling valve 7, are controlled by a controller 8. It is a typical job of this controller 8 to maintain the desired output pressure $p_{out}$ at all times even if the input mass flow $M_{in}$ varies. The input mass flow $M_{in}$ is typically dictated by the mass flow demand for pressurized medium 2 on the output side of the pumping plant 1.

The controller 8 delivers standard operating parameters 12 that deliver the desired output pressure $p_{out}$ at the desired mass flow $M_{in}$ without violating system constraints, but those operating parameters 12 are not optimized for minimum power consumption P yet. To minimize power consumption, the optimal operating parameters O found using the method 100 are superimposed onto the standard operating parameters 12. In the event that the means for performing the method 100 fail, e.g., if the used computer is no longer functional or the connection to a respective cloud service is broken, neutral parameters 13 are superimposed onto the standard parameters 12, so that the pumping plant 1 reverts back to the standard parameters 12. Preferably, the switch between optimal parameters O and neutral parameters 13 is ramp rate limited.

Figure 3:
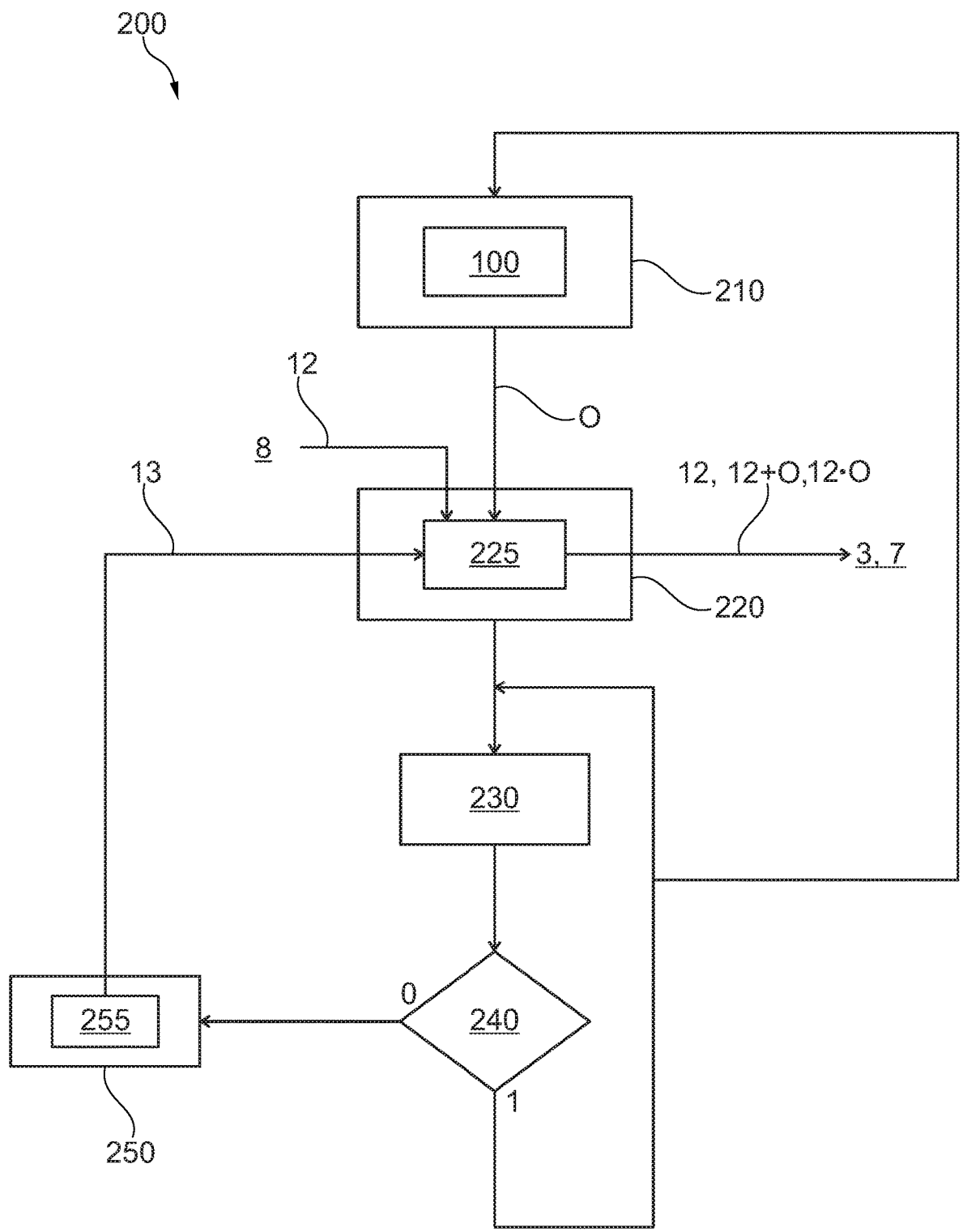
FIG. 3: Exemplary embodiment of the method 200 for operating a pumping plant 1.

FIG. 3 is a flow chart an exemplary embodiment of the method 200 for operating the pumping plant 1. In step 210, the optimal operating parameters O that were determined using the method 100 as described above are obtained. This means that the entity who operates the pumping plant 1 may be the same entity who determines the optimal operating parameters O using the method 100. But the entity who operates the pumping plant 1 may just as well obtain the optimal operating parameters from a different entity who determines, or has determined, them using the method 100. In step 220, those optimal operating parameters O are applied to the pumping plant 1 by setting and/or modifying operating parameters that act upon the set 3 of pumps and the throttling valve 7.

This setting and/or modifying is effected in sub-step 225 by superimposing, onto standard operating parameters 12 delivered by the controller 8, the optimal operating parameters O. As indicated in FIG. 3, this superimposing 225 may be performed in an additive or multiplicative manner.

In step 230, it is monitored whether the means that are used to acquire the optimal operating parameters O are still functional, and a determination whether these means are still functional is made at diamond 240. If the means are still functional, i.e., if the optimal operating parameters O may be assumed to be up-to-date (Boolean value 1 at diamond 240), then the method 200 branches back to the monitoring 230, and/or to the obtaining 210 of optimal parameter values O. Specifically, this obtaining 210 and the monitoring 230 may run in concurrent threads.

If said means are no longer functional (Boolean value 0 at diamond 240), then the superimposing 225 is disabled according to step 250. Specifically, according to sub-step 255, neutral parameter values 13 are introduced into the superimposing 225 (e.g., zeroes for an additive superimposing 225, ones for a multiplicative superimposing 225). The end result is that the superimposing 225 delivers the pure standard operating parameters 12 to the set 3 of pumps and to the throttling valve 7.

Figure 4:
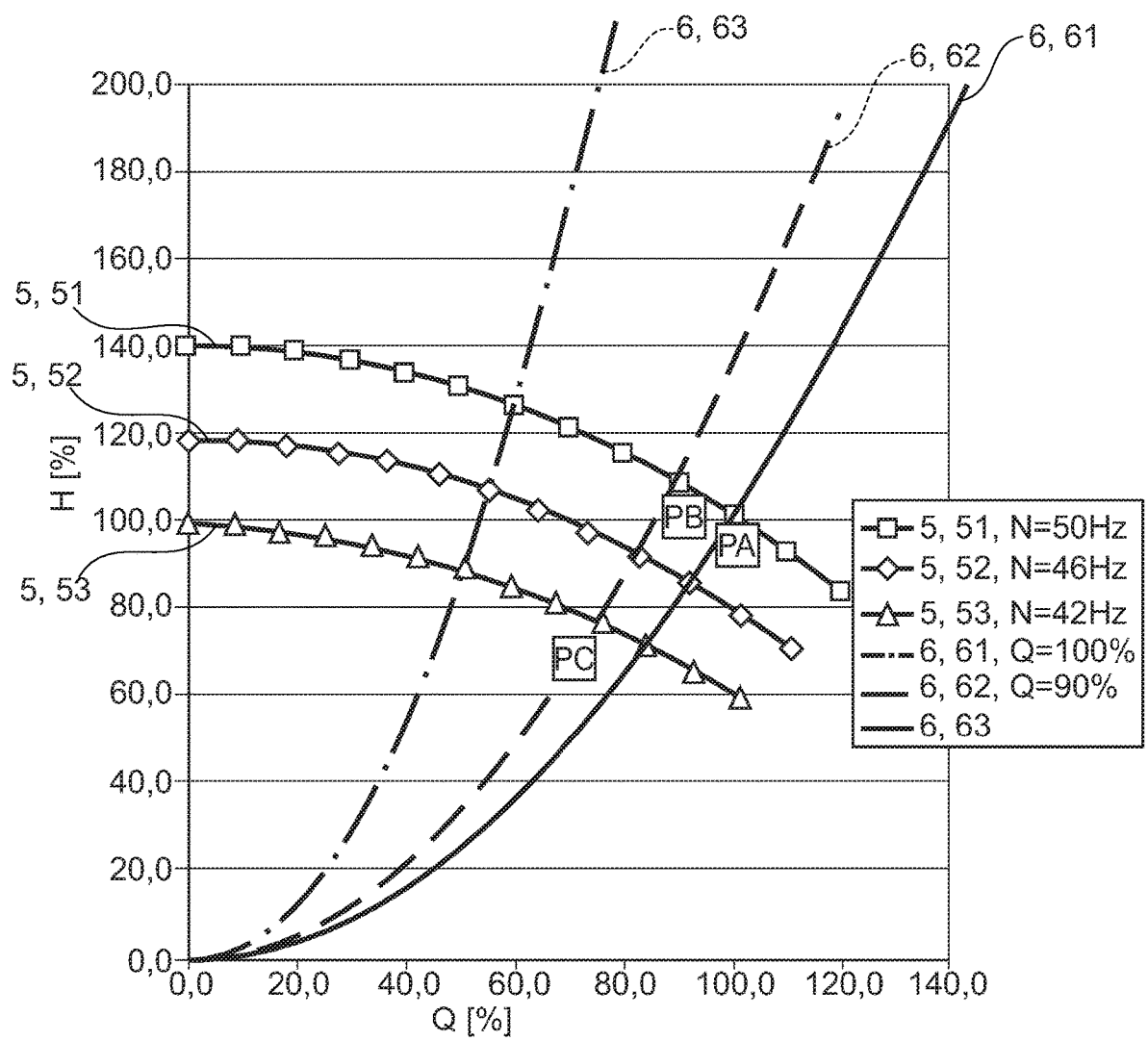
FIG. 4: Exemplary pump curves 5, 51-53, and affinity laws 6, 61-63.

FIG. 4 shows exemplary relationships between the head H and the mass flow Q of a pump that may be dictated by pump curves 5, 51-53. The pump curves 51-53 belong to one and the same pump $3a$-$3c$, but pertain to different rotation speeds N. Pump curve 51 is valid e.g. for a rotation speed N=50 Hz, pump curve 52 is valid e.g. for a rotation speed N=46 Hz, and pump curve 53 is valid e.g. for a rotation speed N=42 Hz. Also, variations of the head H and variations of the mass flow Q are tied together e.g. by affinity laws 6, 61-63 that are parabolas in the H-Q diagram.

The combination of the pump curves 5, 51-53, and the affinity laws 6, 61-63, limits the truly independent degrees of freedom that the optimization 120 may use to determine the optimal operating parameters O. The affinity law curves are dependent on the current mass flow Q from which the variation starts, e.g., affinity law curve 61 describes variations starting form a mass flow Q of 100%, whereas affinity law curve 62 describes variations starting from a mass flow Q of 90%.

For example, starting from a point of operation PA where the head H and the mass flow Q of the pump 3a-3c are at 100% of their respective design values at rotation speed N=50 Hz, the head H may be increased at the price of reducing the mass flow Q by going to point of operation PB along pump curve 51. If it is then desired to reduce the rotating speed, then this may be done along affinity law curve 62, i.e., to point of operation PC at the intersection point between the affinity law curve 62 and the pump curve 53 that corresponds to the new rotating speed N=42 Hz.

Figure 5:
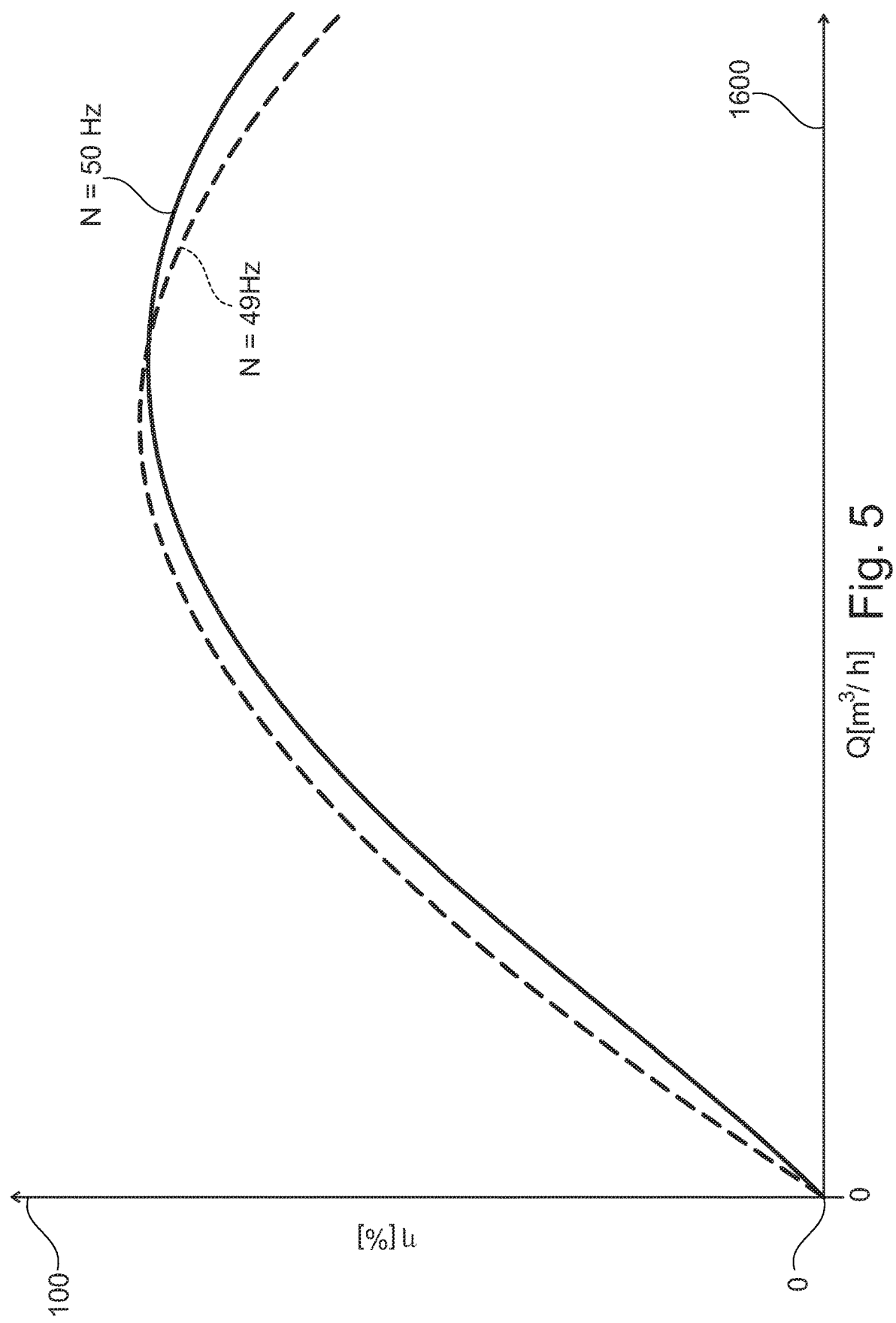
FIG. 5: Exemplary efficiency η for a pump operating at rotation speeds N=50 Hz and N=49 Hz.

FIG. 5 shows the exemplary dependence of the efficiency η of a pump on the mass flow Q, for a rotation speed N=50 Hz (solid curve) and for a rotation speed N=49 Hz (dashed curve). For both rotation speeds, the efficiency η has a maximum, but the location of this maximum on the mass flow axis Q depends on the rotation speed. This indicates that power may be saved by dividing the total required mass flow $M_{in}$ among the available pumps 3a-3c, and adjusting their respective rotation speeds, in a manner that each pump provides a mass flow Q that is as close to the efficiency maximum as possible.

Figure 6:
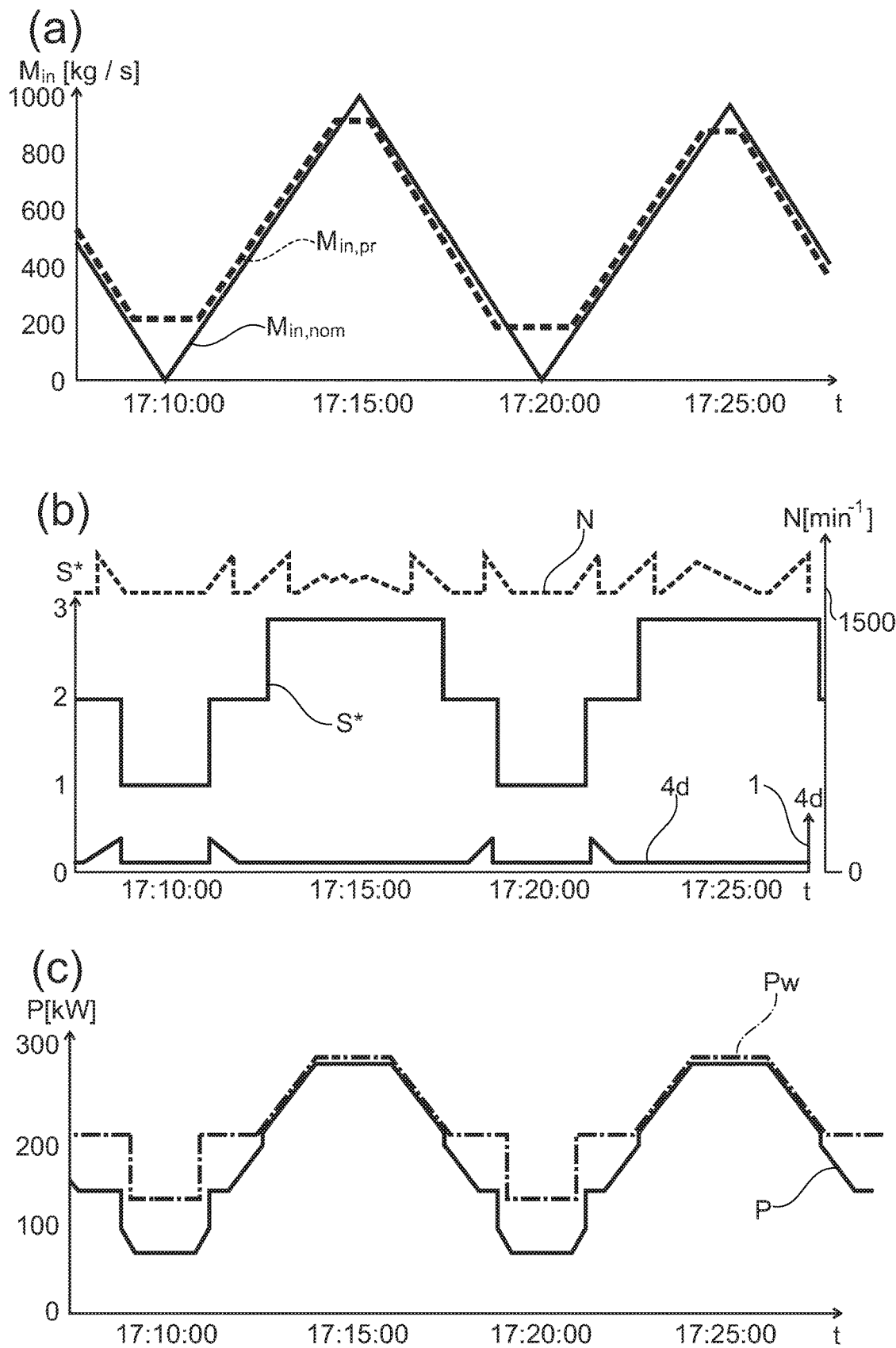
FIG. 6: Exemplary time-varying demand for input mass flow Min (FIG. 6a); resulting actions to be applied to pumping plant 1 (FIG. 6b); power savings resulting from these actions (FIG. 6c).

FIG. 6a shows an exemplary scenario where the nominal mass flow $M_{in,nom}$, drawn as a solid curve, varies with time according to a sawtooth function. The practical set point $M_{in,pr}$ for the mass flow to be provided by the pumping plant 1 is drawn as a dashed curve. It is clipped at a low limit given by the requirement to avoid cavitation, and at a high limit given by the maximum capacity of the plant. The goal is to adapt the operation of the pumping plant 1 to the varying demand $M_{in,pr}$ in a matter that the total power consumption P of the pumping plant 1 is minimized.

FIG. 6b shows the various actions that the method 100 outputs as optimal operating parameters for the plant as a whole. Most importantly, by comparing the minimum power consumptions $P_{min,S1-K}$ in the possible scenarios S1-K, for every point in time a scenario S* is found that provides the lowest power consumption. This scenario is denoted in FIG. 6b by the number of pumps that shall run, and the dependence of the optimal scenario S* on the time t is plotted.

FIG. 6b gives two more examples of time-dependent set points for operating parameters that result from the optimization 120 performed within the respective optimal scenario S*. There are slight but recurring variations in the rotation speed N, at which all pumps that shall run according to the respective scenario are run. These variations coincide mostly with switchovers from one scenario to the next, i.e., they coincide with the stopping and starting of pumps 3a-3c. Switchovers between the scenario with only one running pump 3a-3c and the scenario with two running pumps 3a-3c, in either direction, furthermore trigger a temporary activation of the throttling valve 7, indicated by the set point 4d that represents the set point for pressure drop over the valve, which can be used for a simple pressure control of the valve.

FIG. 6c shows the resulting power savings. The optimal operating strategy results in a power consumption P that varies over time according to the solid curve. All possible operating strategies were calculated, including the worst possible operating strategy, which is shown in FIG. 6c. The worst possible operating strategy results in a power consumption Pw that varies over time according to the dash-dotted curve. FIG. 6c shows that there is relatively little room for improvement at times where the mass flow demand $M_{in,pr}$ is close to the maximum capacity of the pumping plant 1: in such situations, the only option to meet the demand is to run all available pumps 3a-3c. But as the demand $M_{in,pr}$ decreases, the potential for power savings increases. In a situation with a moderate demand $M_{in,pr}$ (such as at the very beginning of the time frame observed in FIG. 6c), the best operating strategy results in considerable power savings compared with the worst operating strategy.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

1 pumping plant
2 to-be-pumped medium
3 set of pumps
3a, 3b, 3c pumps in set 3
4a, 4b, 4c operating parameters for pumps 3a, 3b, 3c
4d set point for throttling valve 7
5, 51-53 pump curves, couple head H to mass flow Q
6, 61-63 affinity laws, couple head H variation to mass flow Q variation
7 throttling valve
8 controller
12 standard operating parameters, output by controller 8
13 neutral operating parameters
100 method for determining optimal parameters O
110 determining K possible scenarios S1-K
120 optimizing parameters O within each scenario S1-K
121 finding constraint-violating scenario during optimization 120
122 culling constraint-violating scenario during optimization 120
130 finding constraint-violating scenario after optimization 120

140 culling constraint-violating scenario after optimization 120
150 determining scenario S* with lowest power consumption $P_{min,S*}$
160 determining final set of operating parameters O
200 method for running pumping plant 1
210 determining optimal operating parameters O for running pumping plant 1
220 applying optimal operating parameters O to pumping plant 1
225 superimposing optimal parameters O onto standard parameters 12
230 monitoring whether optimizing means are still functional
240 determining whether optimizing means are still functional
250 disabling superimposing 225
255 providing neutral parameters to superimposing 225
C constraints
η efficiency
H head of pump 3a-3c
K number of possible scenarios S1-K
$M_{in}$ input mass flow of pumping plant 1
$M_{in,nom}$ nominal input mass flow $M_{in}$
$M_{in,pr}$ input mass flow Min that is practical for pumping plant 1
N rotating speed
O operating parameters
$O_{opt,S1-K}$ optimal operating parameters for scenario S1-K
$O_{opt,S*}$ optimal operating parameters for scenario S*
P power consumption
$P_{min,S1-K}$ minimum power consumption in scenario S1-K
$P_{min,S*}$ power consumption for scenario S*
Pw power consumption in worst scenario S1-K
PA-PC points of operation
pin input pressure of pumping plant 1
pout output pressure of pumping plant 1
Q mass flow of pump 3a-3c
S1-K scenarios with different configurations of running pumps 3a-3c
S* scenario with lowest power consumption
t time

What is claimed is:

1. A method for operating a pumping plant according to a set of optimal operating parameters for the pumping plant, which is configured to pump a fluid medium by a set of multiple pumps connected in parallel, the method comprising:

determining, from the set of pumps, a set of possible scenarios, each scenario indicating, for each pump in the set, whether the pump is running or not running;

optimizing, for each scenario, a set of operating parameters comprising operating parameters of the pumps that are running according to the respective scenario so that all running pumps together bring a given input mass flow of the medium from a given input pressure to a given output pressure while minimizing a total power consumption of all running pumps, and assigning the found minimum power consumption and the corresponding optimal operating parameters to the respective scenario;

determining, from the set of scenarios, the scenario with a lowest power consumption; and determining sought optimal operating parameter to be: running the pumps that are to be run according to the scenario at the operating parameters found for the scenario, and not running the pumps that are not to be run according to the scenario and operating the pumps according to the scenario with the lowest power consumption, wherein the optimizing is performed under a set of constraints for one or more operating conditions of each individual pump, and/or of the plant as a whole, and wherein, during or after the optimizing, a scenario is eliminated from further consideration in response to determining that no minimum power consumption and corresponding optimal operating parameters meeting all constraints exist within the scenario.

2. The method of claim 1, wherein the constraints comprise a minimum flow, a maximum flow, a minimum operating speed, and/or a maximum operating speed, for at least one pump.

3. The method of claim 1, wherein the optimizing is performed given additionally an input temperature of the medium, and the constraints comprise a net positive suction head requirement for at least one pump.

4. The method of claim 1, wherein at least one pump comprises a centrifugal pump.

5. The method of claim 4, wherein the operating parameters of the running pumps comprise a rotating speed of each running pump.

6. The method of claim 5, wherein the optimizing is performed under a further constraint that for each running pump, a head achieved by the pump depends on a flow rate of the pump according to a given pump curve, and wherein the pump curve depends on a rotating speed of the pump.

7. The method of claim 6, wherein the optimizing is performed under a further constraint that for each running pump, a variation of the head of the pump depends on a variation of the flow rate of the pump according to a given affinity law that is dependent on the flow rate of the pump.

8. The method of claim 1 wherein the operating parameters further comprise a set point for a throttling valve that is connected in the plant downstream of the set of pumps.

9. A non-transitory computer readable medium comprising machine readable instructions stored thereon that, when executed by a computer, a controller, and/or an embedded device, cause the computer, the controller, and/or the embedded device, to perform the method according to claim 1.

10. A method for operating a pumping plant that is configured to pump a fluid medium by a set of multiple pumps connected in parallel, the method comprising:

obtaining a set of optimal operating parameters that has been determined, according to the method, from a combination of a given input mass flow of the medium, a given input pressure, and a given output pressure; and setting and/or modifying operating parameters in the pumping plant according to the obtained optimal operating parameters, wherein the modifying set points of operating parameters comprises superimposing the optimal operating parameters onto operating parameters delivered from a controller.

11. The method of claim 10, wherein the controller is configured to equally divide the input mass flow among all pumps in the set of pumps.

12. The method of claim 10, further comprising:

monitoring whether means employed for determining the set of optimal operating parameters O are functional, and disabling the superimposing in response to determining that the means are no longer functional.

13. The method of claim 12, wherein the disabling is performed by superimposing, onto the operating parameters delivered from the controller, neutral parameter values instead of the optimal operating parameters.

14. The method of claim 13, wherein a switching between superimposing optimal operating parameters and neutral parameter values is ramp rate limited.

* * * * *